（12）United States Patent
ter Maat et al.

(10) Patent No.: US 9,556,072 B2
(45) Date of Patent: Jan. 31, 2017

(54) PROCESS FOR THE CONTINUOUS THERMAL REMOVAL OF BINDER FROM A METALLIC AND/OR CERAMIC SHAPED BODY PRODUCED BY INJECTION MOLDING, EXTRUSION OR PRESSING USING A THERMOPLASTIC MOLDING COMPOSITION

(75) Inventors: Johan ter Maat, Mannheim (DE); Hans Wohlfromm, Mannheim (DE); Martin Bloemacher, Meckenheim (DE); Arnd Thom, Alzey (DE); Andreas Kern, Mannheim (DE)

(73) Assignee: BASF SE (DE)

( * ) Notice: Subject to any disclaimer, the term of this patent is extended or adjusted under 35 U.S.C. 154(b) by 1058 days.

(21) Appl. No.: 13/379,894

(22) PCT Filed: Jun. 22, 2010

(86) PCT No.: PCT/EP2010/058802
§ 371 (c)(1),
(2), (4) Date: Dec. 21, 2011

(87) PCT Pub. No.: WO2010/149648
PCT Pub. Date: Dec. 29, 2010

(65) Prior Publication Data
US 2012/0104665 A1 May 3, 2012

(30) Foreign Application Priority Data
Jun. 25, 2009 (EP) .................................... 09163770

(51) Int. Cl.
*B22F 3/12* (2006.01)
*C04B 35/56* (2006.01)
*B22F 3/10* (2006.01)
*C04B 35/111* (2006.01)
*C04B 35/14* (2006.01)
*C04B 35/46* (2006.01)
*C04B 35/478* (2006.01)
*C04B 35/486* (2006.01)
*C04B 35/505* (2006.01)
*C04B 35/563* (2006.01)
*C04B 35/565* (2006.01)
(Continued)

(52) U.S. Cl.
CPC ........ *C04B 35/5626* (2013.01); *B22F 3/1021* (2013.01); *C04B 35/111* (2013.01); *C04B 35/14* (2013.01); *C04B 35/46* (2013.01); *C04B 35/478* (2013.01); *C04B 35/486* (2013.01); *C04B 35/505* (2013.01); *C04B 35/563* (2013.01); *C04B 35/565* (2013.01); *C04B 35/5607* (2013.01); *C04B 35/5611* (2013.01); *C04B 35/581* (2013.01); *C04B 35/583* (2013.01); *C04B 35/584* (2013.01); *C04B 35/58014* (2013.01); *C04B 35/638* (2013.01); *C04B 35/63488* (2013.01); *B22F 2998/00* (2013.01); *B22F 2999/00* (2013.01); *C04B 2235/6021* (2013.01); *C04B 2235/6022* (2013.01); *C04B 2235/6562* (2013.01); *C04B 2235/6567* (2013.01); *C04B 2235/6582* (2013.01); *C04B 2235/6586* (2013.01); *C04B 2235/661* (2013.01)

(58) Field of Classification Search
CPC .................................................... B22F 3/1021
See application file for complete search history.

(56) References Cited

U.S. PATENT DOCUMENTS 5,145,900 A * 9/1992 Sterzel et al. ................. 524/404
5,155,158 A * 10/1992 Kim .............................. 524/424
(Continued)

FOREIGN PATENT DOCUMENTS

EP 0114746 A2 8/1984
EP 0329475 A2 8/1989
(Continued)

OTHER PUBLICATIONS

Alloy Phase Diagrams, ASM Handbook, ASM International, vol. 3; pp. 2.44, 2.48, 2.52, 3.12, 3.17, 1992.
(Continued)

*Primary Examiner* — George Wyszomierski
*Assistant Examiner* — Ngoclan T Mai
(74) *Attorney, Agent, or Firm* — Drinker Biddle & Reath LLP

(57) ABSTRACT

The invention relates to a process for the continuous thermal removal of binder from a metallic and/or ceramic shaped body which has been produced by injection molding, extrusion or pressing using a thermoplastic composition and comprises at least one polyoxymethylene homopolymer or copolymer as binder in a binder removal oven, which comprises the steps (a) removal of binder from the shaped body in a binder removal oven at a temperature which is from 5 to 20° C. below, preferably from 10 to 15° C. below, the temperature of a second temperature stage over a period of from 4 to 12 hours in a first temperature stage in an oxygen-comprising atmosphere, (b) removal of binder from the shaped body at a temperature in the range >160 to 200° C. over a period of from 4 to 12 hours in an oxygen-comprising atmosphere in a second temperature stage and (c) removal of binder from the shaped body at a temperature in the range from 200 to 600° C. over a period of from 2 to 8 hours in a third temperature stage in an oxygen-comprising or neutral or reducing atmosphere, with the shaped bodies being transported through the binder removal oven during process steps (a) and (b).

9 Claims, No Drawings

(51) Int. Cl.

| | | |
|---|---|---|
| *C04B 35/58* | (2006.01) | |
| *C04B 35/581* | (2006.01) | |
| *C04B 35/583* | (2006.01) | |
| *C04B 35/584* | (2006.01) | |
| *C04B 35/634* | (2006.01) | |
| *C04B 35/638* | (2006.01) | |

(56) References Cited

U.S. PATENT DOCUMENTS

| | | | |
|---|---|---|---|
| 5,176,740 | A | 1/1993 | Miura et al. |
| 5,198,489 | A | 3/1993 | Sterzel et al. |
| 5,362,791 | A | 11/1994 | Ebenhoech et al. |
| 5,432,224 | A | 7/1995 | Ryuhgoh et al. |
| 5,439,964 | A * | 8/1995 | Ohst et al. ............ 524/297 |
| 5,531,958 | A | 7/1996 | Krueger |
| 5,611,978 | A | 3/1997 | Truebenbach |
| 5,695,697 | A | 12/1997 | Trubenbach et al. |
| 5,737,683 | A | 4/1998 | Sterzel |
| 2003/0091456 | A1 | 5/2003 | Bloemacher et al. |
| 2003/0220424 | A1 | 11/2003 | Schofalvi et al. |
| 2005/0196312 | A1 | 9/2005 | Nyberg et al. |
| 2008/0075620 | A1 | 3/2008 | Sakata et al. |
| 2008/0199822 | A1 | 8/2008 | Blomacher et al. |
| 2013/0101456 | A1 | 4/2013 | Danninger et al. |

FOREIGN PATENT DOCUMENTS

| | | |
|---|---|---|
| EP | 0413231 A2 | 2/1991 |
| EP | 446708 A2 | 9/1991 |
| EP | 465940 A2 | 1/1992 |
| EP | 0595099 A1 | 5/1994 |
| EP | 0652190 A1 | 5/1995 |
| EP | 0697931 A1 | 2/1996 |
| EP | 0701875 A1 | 3/1996 |
| EP | 1898170 A2 | 3/2008 |
| EP | 1905524 A1 | 4/2008 |
| WO | WO-94/25205 A1 | 11/1994 |
| WO | WO-0181467 A1 | 11/2001 |
| WO | WO-2006134054 A2 | 12/2006 |
| WO | WO-2010149648 A1 | 12/2010 |

OTHER PUBLICATIONS

EP 0413231 machine translation (1991).
Kato et al., "Metal Injection Molding of Pre-alloyed TiA1 Powders with Various Ti/A1 Ratios", Journal of the Japan Society of Powder and Powder Matallurgy, vol. 42, No. 9, pp. 1068-1072, 1995.
Katou et al., Preparation of Sintered Pure-Al Compacts by Using MIM Process, J. Jpn. Soc. Powder Powder Metallurgy, vol. 51, No. 7, 2003.
Liu et al., "Powder Injection Molding of A1-Steel and Magnet) Hybrid Components", Metallurgical and Materials Transactions, vol. 40A, pp. 2785-2788, Dec. 2009.
Liu, et al., "Metal Injection Moulding of Aluminum Alloy 6061 with Tin", Powder Metallurgy, vol. 51, pp. 78-83, 2008.
Weber et al., IPAM Advancing MIM Technology, MRR, vol. 52, No. 6, pp. 22-26, 1997.
Wegmann et al., "Injection Molding and Ractive Sintering of $Ni_3Al$", Advances in Powder Metallurgy, vol. 2, pp. 175-180, 1991.
WO 2010/149648 A1 machine translation, original published Dec. 29, 2010.
Zlatkov et al., "Recent Advances in PIM Technology I", Science of Sintering, 40, pp. 79-88, 2008.

* cited by examiner

PROCESS FOR THE CONTINUOUS THERMAL REMOVAL OF BINDER FROM A METALLIC AND/OR CERAMIC SHAPED BODY PRODUCED BY INJECTION MOLDING, EXTRUSION OR PRESSING USING A THERMOPLASTIC MOLDING COMPOSITION

PRIORITY

Priority is claimed as a national stage application, under 35 U.S.C. §371, to PCT/EP2010/058802, filed Jun. 22, 2010, which claims priority to European Application No. 09163770.2, filed Jun. 25, 2009. The disclosures of the aforementioned priority applications are incorporated herein by reference in their entirety.

DESCRIPTION

The present invention relates to a process for the continuous thermal removal of binder from a metallic and/or ceramic shaped body which has been produced by injection molding, extrusion or pressing using a thermoplastic composition and comprises at least one polyoxymethylene homopolymer or copolymer as binder. The invention further relates to an apparatus for carrying out the process of the invention.

Metallic and/or ceramic shaped bodies comprising polyoxymethylene homopolymers or copolymers (polyacetals) as auxiliaries (binders) for shaping are generally subjected after shaping to binder removal in a catalytic process step without the shaped bodies themselves changing shape. Here, the binder used is converted into low molecular weight constituents present in the gaseous state with the aid of a reaction partner such as hydrochloric acid or nitric acid in a carrier gas under suitable process conditions, particularly with regard to temperature, and these constituents are converted into environmentally acceptable compounds by burning in a flare. However, the use of acidic reaction partners such as nitric acid, in particular, places high demands on the binder removal ovens used and is therefore complicated in terms of handling.

Examples of such catalytic binder removal processes may be found, inter alia, in EP 0 697 931 A1, EP 0 595 099 A1, EP 0 701 875 A1 and EP 0 652 190 A1.

However, the catalytic binder removal process is not always suitable for "acid-labile" materials such as Cu-, Co,- Mg-, and also MgO- or $Si_3N_4$-based or -comprising materials. As an alternative to this process, it has been shown in the past that polyacetals can also be removed from the shaped body purely thermally.

Thus, EP 0 114 746 A2 discloses a process for the thermal removal of binder from Polyacetal-comprising shaped bodies by single-stage heating of the shaped bodies obtained after injection molding (known as green bodies) to a temperature in the range from 20 to 300° C. at a heating rate of from 5 to 20° C. or >100° C. per hour. However, such a thermal binder removal process has, particularly in the case of relatively large shaped bodies, the disadvantage that bubble and crack formation in the shaped body can occur which frequently makes such a shaped part unusable.

It therefore an object of the present invention to provide an environmentally friendly, continuos process for thermal binder removal, in which the abovementioned disadvantages of the prior art are avoided.

This object is achieved by a process for the continuous thermal removal of binder from a metallic and/or ceramic shaped body which has been produced by injection molding, extrusion or pressing using a thermoplastic composition and comprises at least one polyoxymethylene homopolymer or copolymer as binder in a binder removal oven, which comprises the steps (a) Removal of binder from the shaped body in a binder removal oven at a temperature which is from 5 to 20° C. below, preferably from 10 to 15° C. below, the temperature of a second temperature stage over a period of from 4 to 12 hours in a first temperature stage in an oxygen-comprising atmosphere, (b) Removal of binder from the shaped body at a temperature in the range >160 to 200° C. over a period of from 4 to 12 hours in an oxygen-comprising atmosphere in a second temperature stage and (c) Removal of binder from the shaped body at a temperature in the range from 200 to 600° C. over a period of from 2 to 8 hours in a third temperature stage in an oxygen-comprising or neutral or reducing atmosphere, with the shaped bodies being transported through the binder removal oven during process steps (a) and (b).

If process step (c) is carried out in an oxygen-comprising atmosphere like process steps (a) and (b), then, in a preferred embodiment of the invention, this process step (c) is also carried out in the binder removal oven used in process steps (a) and (b). If this is not tolerable, this process step is advantageously integrated into the subsequent sintering process.

It has been found that the process of the invention allows the continuous thermal removal of binder from shaped bodies while making it possible to dispense entirely with the use of acidic reaction partners as catalysts for the composition of the binders.

The choice of temperature for the second temperature stage, process step (b), depends on the particle size and packing density of the shaped bodies. Furthermore, both the binder selected and the alloy play an important role in the choice of the binder removal temperature in process step (b). If the shaped body is, for example, a shaped body of copper in POM, the preferred temperature in process step (b) is about 200° C. The hold time is from 3 to 8 hours, preferably from 5 to 7 hours. If the body is a W—Cu-alloy in POM having a proportion of Cu of 10% by weight, based on the alloy, the preferred temperature in process step (b) is about 175° C. The hold time is from 4 to 10 hours, preferably from 6 to 8 hours. If the body is a $ZrO_2$-ceramic in POM, the preferred temperature in process step (b) is about 160° C. The hold time is from 6 to 12 hours, preferably from 8 to 10 hours.

The third binder removal step, process step (c), ensures that the organic constitutents remaining after process steps (a) and (b) are virtually completely removed from the shaped part. This advantageously reduces the liberation of carbon-comprising decomposition products from the shaped part during subsequent sintering of the shaped part considerably, as a result of which the furnaces used for sintering suffer considerably less contamination.

The present invention further provides a process for producing metallic and/or ceramic shaped bodies from a thermoplastic composition by (d) shaping of the thermoplastic composition by injection molding, extrusion or pressing to form a green body,
(e) removal of the binder as described above and
(f) subsequent sintering of the green body from which the binder has been removed in step (e).

For the purposes of the present invention, the term "binder removal oven" refers to an oven or an oven plant having one or more chambers. The corresponding ovens are described in more detail in the following part of the description.

For the purposes of the present invention, metallic shaped bodies are components which can be obtained by injection molding, extrusion or pressing of thermoplastic molding compositions comprising metal powders. Examples of metal powders are powders of Fe, Al, Cu, Nb, Ti, Mn, V, Ni, Cr, Co, Mo, W and Si. The metal powders can likewise be used in the form of alloys, for example as copper-based alloys such as brass, bronze, Monel™ and alloys having a high Co content e.g. Kovar™ and Permendur™. Of course, it is also possible to use mixtures of the metals mentioned.

Metallic shaped bodies which are preferred for the purposes of the present invention are those which can be obtained from powder injection molding compositions, particularly preferably from powder injection molding compositions of copper-based alloys such as pure copper, Monel™ and W—Cu-alloys.

Ceramic shaped bodies are, for the present purposes, parts which can be obtained by injection molding, extrusion or pressing of the thermoplastic molding compositions of oxidic ceramic powders, for example powders of $Al_2O_3$, $Y_2O_3$, $SiO_2$, $ZrO_2$, $TiO_2$ or $Al_2TiO_5$. Nonoxidic ceramic powders such as $Si_3N_4$, SiC, BN, $B_4C$, AlN, TiC, TiN, TaC and WC are also suitable. Of course, it is also possible to use mixtures of the ceramic materials mentioned and mixtures of ceramics and metals, for example cemented carbides (WC and Co).

Ceramic shaped bodies which are preferred for the purposes of the present invention are those which can be obtained from $Al_2O_3$—, $ZrO_2$— or $Si_3N_4$— comprising thermoplastic molding compositions. Owing to the above-mentioned reactivity of Co, WC—Co mixtures are also a preferred ceramic/metal powder mixture.

For the purposes of the present invention, the terms "injection molding" (also referred to as powder injection molding), "extrusion" and "pressing" are used in the sense of processes from powder technology, in particular powder metallurgy, in which, for example, a shaped body from which the binder is subsequently removed and which is then sintered to produce the finished workpiece is produced by injection molding of a thermoplastic injection molding composition comprising metal or ceramic powder and a proportion of usually at least 30% by volume of a thermoplastic binder. The metal powder injection molding combines the advantages of the shaping by injection molding or extrusion known from plastics technology with those of classical powder metallurgy. In the case of classical powder metallurgy (also referred to as "P/M"), metal powder is often admixed with up to 10% by volume of lubricant such as oil or wax, brought to the desired shape by pressing and the pressed body is subsequently sintered. The advantage of powder-metallurgical processes is the freedom with which the material can be selected. The powder-metallurgical process allows sintering of a metal powder mixture to produce materials which cannot be produced by melt-metallurgical processes. A significant disadvantage of classical powder metallurgy by pressing and sintering is that it is not suitable for producing workpieces having relatively complex geometric shapes. For example, shapes having undercuts i.e. recesses transverse to the pressing direction, cannot be produced by pressing and sintering. In the case of injection molding, on the other hand, virtually any desired shape can be produced. However, metal powder injection molding has the disadvantages that anisotropies sometimes occur in the casting mold in the case of relatively large workpieces and that a separate step for removing the binder has to be carried out. Metal powder injection molding is therefore employed predominantly for relatively small workpieces having complicated shapes.

The polyoxymethalene homopoloymers and copolymers mentioned as binders and their preparation are known to those skilled in the art and are described in the literature. The homopolymers are usually prepared by polymerization (mostly catalyzed polymerization) of formaldehyde or trioxane. To prepare polyoxymethylene copolymers, a cyclic ether or a plurality of cyclic ethers is/are usually used as comonomer together with formaldehyde and/or trioxane in the polymerization, so that the polyoxymethylene chain with its sequence of (—$OCH_2$)-units is interrupted by units in which more than one carbon atom is present between two oxygen atoms. Examples of cyclic ethers which are suitable as comonomers are ethylene oxide, 1,2-propylene oxide, 1,2-butylene oxide, 1,3-dioxane, 1,3-dioxolane, dioxepane, linear oligoformals and polyformals such as polydioxolane or polydioxepane and also oxymethylene terpolymers.

In general, the binder comprises at least 80% by weight of polyoxymethylene (POM) and can additionally comprise further polymers, for example polystyrene, polypropylene, polyethylene and ethylene-vinyl acetate copolymers and also further auxiliaries which may be necessary, e.g. dispersants, plasticizers and mold release agents. In particular, the further polymers mentioned, e.g. polystyrene, polyproplene, polyethylene and ethylene-vinyl acetate copolymers, and also any further auxiliaries which may be necessary, e.g. dispersants, plasticers and mold release agents, are removed from the shaped part in process step (c) of the process of the invention.

Such binders are disclosed, for example, in EP 446 708 A2, EP 465 940 A2 and WO 01/81467 A1.

According to the invention, the continuous thermal removal of binder in the binder removal oven is carried out using the temperature/time profile defined in process steps (a) (b) and (c). Process step (c) can be carried out in the same oven in which the process steps (a) and (b) are carried out. However, process step (c) can also be carried out in a separate oven.

In a preferred embodiment of the invention, process steps (a) (b) and (c) are carried out in the same binder removal oven. In this embodiment of the invention, the shaped parts are moved continuously through the oven during process steps (a), (b) and (c).

The continuous thermal binder removal is, according to the invention, carried out in an oxygen-comprising atmosphere, the presence of atmospheric oxygen or, in particular, in the presence of air. The term "atmosphere" or "oven atmosphere" means, for the purposes of the invention, air or air which has been heated to the appropriated temperature and surrounds the shaped bodies while the process of the invention is being carried out.

In a preferred embodiment of the invention, the oven atmosphere, i.e. air, flows around the shaped bodies during process steps (a) and (b) or during process step (a) or during process step (b). The flow velocity selected can be varied within a wide range and is generally >1 m/s, preferably >3 m/s and particularly preferably >5 m/s. The amount of air transported through the binder removal oven depends on the dimensions of the oven and is generally from 1 to 50 $m^3$/h, preferably from 15 to 25 $m^3$/h.

In a preferred embodiment of the invention, the oven atmosphere, in this case an inert gas atmosphere, for example a nitrogen atmosphere or a reducing atmosphere, for example a hydrogen atmosphere, flows around the shaped bodies during process step (c). The flow velocity selected can be varied over a wide range and is generally >1 m/s, preferably >3 m/s and particularly preferably >5 m/s. The amount of the atmosphere transported through the binder removal oven depends on the dimensions of the oven and is generally from 1 to 50 m$^3$/h, preferably from 15 to 25 m$^3$/h.

During the process of the invention, the shaped body or bodies is/are transported continuously through the binder removal oven during process steps (a) and (b). In a further preferred embodiment of the invention, the shaped body or bodies is/are transported continuously through the binder removal oven during process steps (a), (b) and (c). The shaped body is, for example, transported in a batch carrier along a transport path through the binder removal oven, with transport being able to be effected, for example, by means of a conveyor belt, a sliding track or a roller track with buffer facility, etc. The apparatus can have one transport path or a plurality of transport paths arranged next to one another. The shaped bodies which are to be subjected to binder removal are advantageously located in gas-permeable batch carriers which move on a conveyor belt or a sliding track or roller track through the binder removal oven. In an embodiment of the invention, a plurality of batch carriers can be stacked on top of one another. The batch carriers are preferably gas-permeable and preferably have lateral perforated walls which ensure good contact of the shaped bodies to be subjected to binder removal with the oven atmosphere.

The continuous thermal removal of binder takes place in oven plants in which the shaped bodies, also referred to as green bodies, are subjected to defined temperatures over defined periods of time in an oxygen-comprising atmosphere, preferably in an air atmosphere. Preferred ovens are binder removal ovens as are described for the catalytic removal of binder from PIM parts, for example in WO 2006/134054 A2 or EP 1 898 170 A2.

In a first preferred embodiment of the invention, the binder removal oven is an oven through which the shaped bodies travel in a transport direction while being brought to the above-defined temperatures for the above-defined periods of time.

In one embodiment of the invention, one or more devices which specifically lead to flow of the oven atmosphere transverse to the transport direction of the shaped bodies can be present.

The shaped bodies to be subjected to binder removal are distributed on transport boxes for transport through the oven over a suitable residence time. The transport boxes can be configured so that uniform flow of gas around the shaped bodies to be subjected to binder removal is promoted. For this purpose it is advantageous for a transport box to have a gas-permeable bottom and gas-permeable side walls, as a result of which vertical flow through the transport box and a desired transverse flow onto the shaped body are achieved.

In general, a conveyor belt transports the transport boxes loaded with the shaped bodies to be subjected to binder removal through the oven at a speed corresponding to the residence time to be set. In an embodiment of the invention, the belts in the case of forward and return movement of the conveyor belt are, for example, separated from one another by a perforated metal sheet. The perforated metal sheet is particularly preferably replaced by a closed metal sheet over part of the length or over the entire length of the conveyor belt. In this way, downward-directed short circuit flow of the oven atmosphere in the region of the return of the conveyor belt is minimized. Advantageously, guide plates which are provided both in an upper region of the binder removal oven and in the region of a conveyer belt reduce short circuit flows by reducing the free flow cross section. In addition, they define, in a preferred embodiment of the invention, a flow path of the oven atmosphere which is directed largely vertically relative to the transport direction and thus improve the flow around the shaped bodies to be subjected to binder removal.

Guide plates provided in the lower region of the binder removal oven in which the conveyor belt runs the force a flow of gas directed vertically upward through the transport boxes and thus contribute to a homogeneous oven atmosphere.

Guide plates provided in the upper region of the binder removal oven can be located on the ceiling of the binder removal oven. Preference is given to arrangement of these guide plates on the uppermost layer of the transport boxes loaded with shaped bodies, since the height of the shaped body batch to be subjected to binder removal and located on the transport boxes can be varied in this way.

In an embodiment of the invention, the binder removal oven can have one or more circulation devices, for example in the form of fans, distributed uniformly along the binder removal oven. The circulation devices, which are arranged either only on a side wall of the binder removal oven or preferably alternately on two opposite side walls, effects the turbulent flow of the oven atmosphere and as a result homogeneous mixing of the interior of the binder removal oven. At the same time, an efficiency-increasing transverse flow onto the shaped body is achieved.

In an advantageous embodiment, one or more inlets for air, in particular for heated air, into the binder removal oven are provided. In particular, a plurality of uniformly distributed binder removal positions are advantageous, since additional mixing of the atmosphere in the interior of the oven is achieved in this way. Thus, introduction of preheated oxygen-comprising air from above into the binder removal oven at a number of points, preferably at high velocity, leads to advantageous vertical flows.

A further preferred embodiment of the binder removal oven seeks to obtain flow directed largely transversely to the transport direction onto the shaped bodies located on transport boxes. For this purpose, the atmosphere required for binder removal, in particular the air required for binder removal, is introduced into the interior of the binder removal oven via one or preferably more laterally arranged inlets. These lateral inlets can be distributed uniformly over the entire length of the binder removal oven or can be provided only in a section thereof. Here, inlets on one side of the binder removal oven and preferably inlets arranged alternately on two opposite sides are conceivable. The inlets can be configured as slits, as holes or as nozzles. The atmosphere which is in this way introduced laterally flows through the transport boxes and thus past the shaped bodies to be subjected to binder removal largely transverse to the transport direction. Such a transverse flow onto the shaped bodies which is achieved by means of the lateral inlets for the atmosphere can be supplemented by circulation devices arranged on one or both sides.

The binder removal oven is, according to the second preferred embodiment of the invention described below, an oven which is divided in the transport direction of the shaped bodies into at least two successive treatment chambers through which the transport path extends. The oven thus has at least two treatment chambers which are separated from one another and are arranged in succession in the transport direction of the shaped bodies, so that different thermal treatments of the shaped bodies can be carried out in these treatment chambers. For this purpose, each treatment chamber has inlet facilities for the treatment atmosphere, i.e. each treatment chamber is supplied, independently of the other, with the appropriate atmosphere i.e. air at the appropriate temperature. In each treatment chamber, the atmosphere is circulated by means of a circulation device assigned to each treatment chamber, so that the shaped bodies passing through the treatment chamber come into contact with the appropriate atmosphere. Here, air inlet facilities which result in flow of the appropriate atmosphere onto the shaped bodies transverse to the transport direction of the shaped bodies are provided in each treatment chamber.

The transverse flow of the atmosphere onto the shaped bodies in the respective treatment chamber allows essentially the same conditions to be set and maintained over the length of the treatment chamber, since, for example, temperature gradients in the longitudinal direction of the chambers are avoided in this way. Furthermore, good flow onto even shaped bodies having a particularly complex structure can be achieved, so that binder removal can also be improved in this way. The binder removal oven can have one or more transport paths arranged side-by-side. The binder removal oven preferably has two transport paths arranged side-by-side.

Particularly good binder removal results are achieved in a binder removal oven in which the circulation devices and/or atmosphere guide devices of adjacent treatment chambers are configured or set/adjustable so that the atmosphere flows from opposite directions onto the shaped bodies in the adjacent treatment chambers. This alternate flow onto the shaped bodies from chamber to chamber ensures equalization of treatment gradients (temperature gradients) in the longitudinal direction of the oven and ensures a particularly good and uniform flow (from both sides) onto the shaped bodies.

Correspondingly good results are achieved by means of an oven in which the circulation device and/or the atmosphere guide devices of a treatment chamber are configured or set/adjustable so that the atmosphere flows from opposite directions onto the shaped bodies within the treatment chamber. This embodiment differs from the above-described embodiment in that the alternating flow onto the parts occurs within a treatment chamber and not from treatment chamber to treatment chamber. In the last-named embodiment, a plurality of treatment chambers in which alternating flow of the appropriate atmosphere onto the shaped bodies, for example from the left in one part of the chamber and from the right in the other part of the chamber, occurs in each case can be connected in series. If the directional flow varies from chamber to chamber, flow from the left, for example, occurs in one chamber and flow from the right occurs in the neighbouring chamber.

In an embodiment having two parallel transport paths, the corresponding atmosphere is preferably introduced from both sides into one chamber, while in the neighbouring chamber the atmosphere flows in the opposite direction, i.e. away from the parts on both sides.

A radial blower is preferably used as circulation device in the oven. Such blowers are used particularly when a single transport path extends all the way through the oven. In another embodiment, the circulation device is an axially drawing and radially pushing blower or a blower operating conversely. Such an embodiment is used, in particular, in the case of two parallel transport paths of the shaped parts, with the blower being arranged between the two transport paths so that the atmosphere is blown onto the transport paths either laterally from the outside or from the inside. The blowers are preferably located on the upper side of the treatment chambers. The preferred directional flow onto the shaped bodies is lateral. However, the atmosphere guide devices can also be arranged so that flow onto the shaped bodies occurs from below. As mentioned above, the circulation device is preferably arranged on the underside of the treatment chamber. However, the circulation device can also be located laterally on/in the treatment chamber. In general, each treatment chamber has one circulation device. Here, a single circulation device or two treatment chamber parts separated from one another by a dividing wall can be supplied with the oven atmosphere. The circulation device preferably produces flow of the atmosphere onto the shaped bodies located in the treatment chamber from one direction, advantageously from a lateral direction from the outside. However, the circulation device can also supply the atmosphere to the parts located in a treatment chamber simultaneously from two opposite directions. This is, as mentioned above, particularly the case when two parallel transport paths are arranged side-by-side and the circulation device is located between two transport paths. Here, simultaneous flow of the atmosphere onto the shaped bodies on the two transport paths preferably takes place laterally from the outside.

The binder removal oven is also provided with suitable heating facilities. It goes without saying that each treatment chamber preferably has dedicated heating facilities. The design and arrangement of these heating facilities is within the general knowledge of a person skilled in the art.

As transport device, the binder removal oven can preferably have a continuous belt or a sliding track or roller track with buffer facility. It can thus be advantageous to use belt ovens or buffer ovens as ovens. The shaped bodies to be subjected to binder removal are advantageously located in gas-permeable batch carriers which move on the conveyor belt or the sliding track or roller track through the oven. A plurality of batch carriers can be stacked on top of one another. Since the batch carriers are gas-permeable and for this purpose have, for example, lateral perforated walls, good contact of the atmosphere with the shaped body to be treated is ensured.

In a preferred embodiment, the shaped body is heated to the temperature of the first temperature stage at a heating rate of from 1 to 4° C./minute before process step (a) is carried out. This ensures that binder removal commences simultaneously in all green parts; a high temperature gradient causes an excessively high decomposition rate and leads to bubbles and cracks.

In a further preferred embodiment of the invention, the shaped body is, after process step (b), heated to the temperature of the third binder removal step (c) at a heating rate of from 1 to 7° C./minute, preferably at a heating rate of from 2 to 5° C./minute, and then maintained at the temperature of the third binder removal step (c). The temperature of the third binder removal step (c) is generally from 200 to 600° C., preferably from 300 to 500° C. and more preferably from 400 to 450° C. The hold time varies as a function of the composition of the shaped body and is generally from 0.5 to 4 hours.

After the removal of the binder in process steps (a), (b) and (c) the shaped body is sintered. Sintering is carried out by known methods. Depending on the desired result, sintering is carried out, for example, in air, hydrogen, nitrogen, gas mixtures or under reduced pressure.

The composition of the oven atmosphere which is optimal for sintering, the pressure and the optimal temperature conditions depend on the precise chemical composition of the material used or to be produced and are known or can be determined in a simple manner in each individual case by means of a few routine tests.

The optimal heating rates are easily determined by means of a few routine tests and are usually at least 1° C./minute, preferably at least 2° C./minute and particularly preferably at least 3° C./minute. For economic reasons a very high heating rate is generally sought. However, to avoid an adverse effect on the quality of sintering, a heating rate below 20° C./minute will usually be set. It is sometimes advantageous to employ a delay time at a temperature below the sintering temperature during heating to the sintering temperature, for example to hold a temperature in the range from 500° C. to 700° C., for example 600° C., for a period from 30 minutes to 2 hours, for example one hour.

The sintering time i.e. the hold time at the sintering temperature, is generally set so that the sintered shaped parts are sintered to sufficient density. At customary sintering temperatures and part sizes, the sintering time is generally 15 minutes and preferably at least 30 minutes. The total duration of the sintering process has a major effect on the production rate, and sintering is therefore preferably carried out so that the sintering process does not take an unsatisfactorily long time from an economic point of view. In general, the sintering process (including the heating phase but without the cooling phase) will be able to be concluded after from 6 to 18 hours, usually after from 7 to 12 hours.

After sintering, any desired after-treatment, for example sinter hardening, austenite formation, annealing, hardening, upgrading, carburization, case hardening, carbonitriding, nitriding, steam treatment, solution heat treatment, quenching in water or oil and/or hot isostatic pressing of the sintered shaped parts or a combination of these treatment steps, can be carried out. Some of these treatment steps, for instance sinter hardening, nitriding or carbonitriding can also be carried out in a known way during sintering.

The invention is illustrated by the following examples.

EXAMPLE 1

Experiments on continuous thermal binder removal were carried out in a plant described in detail in EP 1898170 A2. The binder removal plant utilized comprised two chambers, each with dedicated circulation and gas supply. The boxes with green parts were pushed on two tracks into the binder removal plant.

In each transport box, 3 kg of green parts made of Catamold® 316LG were pushed in on three levels. In initial preliminary tests, it was established that very satisfactory results could be achieved at a speed of rotation of the fan of 1200 rpm; measurements indicated that this speed of rotation corresponded to a gas velocity of 7 m/min over the green parts; at below 3 m/min, the duration of the process was more than about 50% longer and thus significantly less economical.

The necessary amount of air was likewise determined in preliminary tests. Here, a total amount of air of 20 m³/h was found to be sufficient. Of this total amount, 15 m³/h were introduced into the second chamber and 5 m³/h were introduced into the first chamber.

The necessary conditions for satisfactory binder removal were found at a temperature of 170° C. in the first chamber and 180° C. in the second chamber and an effective resonance time of 7 h per chamber. The green parts composed of Catamold 316LG displayed a weight loss of 7.79% by weight. For catalytic binder removal, the weight loss should be at least 7.6% by weight.

At temperatures only 3° C. higher, hairline cracks could be seen on the surface; a further increase by another 3° C. resulted in additional occurrence of bubbles. At temperatures which were 3° C. lower, the green parts were intact but the binder had not been completely removed (weight loss 7.48% by weight). At a higher transport speed (5 h per chamber), binder removal was both incomplete and associated with the occurrence of hairline cracks. Under the conditions found, a throughput of green parts of about around 0.5 kg/h was achieved in continuous operation. The parts which had been subjected to binder removal were subjected to removal of residual binder and sintered under hydrogen; for this purpose, a heating rate of 5° C./min was chosen in the range 20-600° C. This was followed by further heating at 10° C./min to 1380° C. The temperature was held here for 3 h and the parts were cooled again at 10° C./min.

The parts displayed a good sintered density of 7.93 g/ml, i.e. 99.2% of the theoretical density of this alloy.

EXAMPLE 2

Experiments using Catamold 17-4PHW were then carried out in the same plant. After carrying out similar optimization work, it was found that only the temperatures and residence times had to be adapted slightly. The good parts from which the binder had been removed were then found at a residence time of 8 h per chamber and at 172° C. in the first chamber and 180° C. in the second chamber. The parts had a weight loss of 7.38% by weight. For catalytic binder removal, the weight loss should be above 7.2%.

Sintering under hydrogen under the same conditions as in example 1 but at a sintering temperature of only 1350° C. gave a sintered density of 7.63 g/ml. This corresponds to a sintered density of 98.8% of theory.

EXAMPLE 3

Experiments using a development product based on pure copper powder were carried out in the same plant. Since this material was still in development and no large amounts of product were available, the loading with green parts made of Catamold 17-4PHW as a working load was simulated; these were loaded on the upper and lower levels, while green parts made of the Cu feedstock were positioned on the middle level.

After carrying out optimization, green parts from which binder had been correctly removed were obtained at a residence time of 6 h per chamber and at a temperature of 195° C. in the first chamber 200° C. in the second chamber. The weight loss during thermal binder removal was 7.5% by weight. The comparative value from catalytic binder removal was not available as a guide because the Cu powder reacts with gaseous nitric acid to form nitrate and the pores become blocked thereby. Parts from which binder had been removed in this way were sintered under hydrogen in a similar cycle to example 1 but at a sintering temperature of 1050° C. to a density of 8.71 g/ml; this corresponds to 96.7% of theory.

The invention claimed is:

1. A process for the continuous thermal removal of binder from a metallic and/or ceramic shaped body which has been produced by injection molding, extrusion or pressing using a thermoplastic composition and comprises at least one polyoxymethylene homopolymer or copolymer as binder, wherein the binder comprises at least 80% by weight of polyoxymethylene, in a binder removal oven, which comprises the steps (a) Removal of binder from the shaped body in a binder removal oven at a temperature which is from 5 to 20° C. below the temperature of a second temperature stage over a period of from 4 to 12 hours in a first temperature stage in an oxygen-comprising atmosphere, (b) Removal of binder from the shaped body at a temperature in the range >160 to 200° C. over a period of from 4 to 12 hours in an oxygen-comprising atmosphere in a second temperature stage and (c) Removal of binder from the shaped body at a temperature in the range from 200 to 600° C. over a period of from 2 to 8 hours in a third temperature stage in an oxygen-comprising or neutral or reducing atmosphere, with the shaped bodies being transported through the binder removal oven during process steps (a) and (b) wherein if the shaped body is the metal shaped body then the molding composition comprises metal powders wherein the metal powder is selected from the group consisting of Fe, Cu, Nb, Ti, Mn, V, Ni, Cr, Co, Mo, W and Si and the metal powder can be in the form of an alloy.

2. The process according to claim 1, wherein the shaped body is heated to the temperature of the first temperature stage at a heating rate of from 1 to 4° C./minute before process step (a) is carried out.

3. The process according to claim 1, wherein process steps (a), (b) and (c) are carried out in the same binder removal oven and the shaped body is transported through the binder removal oven during process steps (a), (b) and (c).

4. The process according to claim 1, wherein an oven having at least two successive treatment chambers is used as binder removal oven.

5. The process according to claim 1, wherein an oven having gas guide devices which effect the flow of the oxygen-comprising atmosphere onto the shaped body transverse to the transport direction of the shaped body during process step (a) and/or (b) and/or (c) is used as binder removal oven.

6. The process according to claim 1 for the removal of binder from ceramic shaped bodies.

7. The process according to claim 1 for the removal of binder from metallic shaped bodies.

8. A process for producing metallic and/or ceramic shaped bodies from a thermoplastic composition by
(d) shaping of the thermoplastic composition by injection molding, extrusion or pressing to form a green body,
(e) removal of the binder by a process according to claim 1
(f) subsequent sintering of the green body from which the binder has been removed in step (e).

9. The process according to claim 1 with the proviso the metal shaped body does not contain an aluminum alloy.

* * * * *